United States Patent
Kadosh

(10) Patent No.: US 11,966,376 B1
(45) Date of Patent: Apr. 23, 2024

(54) SYSTEM, METHOD, AND COMPUTER PROGRAM FOR PRESENTING TREE DATA STRUCTURES IN TABLES

(71) Applicant: Amdocs Development Limited, Limassol (CY)

(72) Inventor: Yoav Kadosh, Pardes Hanna Karkur (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 35 days.

(21) Appl. No.: 16/989,575

(22) Filed: Aug. 10, 2020

(51) Int. Cl.
*G06F 16/22* (2019.01)
*G06F 16/25* (2019.01)

(52) U.S. Cl.
CPC ...... *G06F 16/2246* (2019.01); *G06F 16/2237* (2019.01); *G06F 16/2282* (2019.01); *G06F 16/258* (2019.01)

(58) Field of Classification Search
CPC ............. G06F 16/2246; G06F 16/2237; G06F 16/2282; G06F 16/258
See application file for complete search history.

(56) References Cited

U.S. PATENT DOCUMENTS

| | | | |
|---|---|---|---|
| 6,480,857 B1 | 11/2002 | Chandler | |
| 6,502,101 B1 | 12/2002 | Verprauskus et al. | |
| 6,961,733 B2 * | 11/2005 | Mazzagatti | G06F 16/2246 707/999.102 |
| 7,421,445 B2 | 9/2008 | O'Neil et al. | |
| 7,505,960 B2 * | 3/2009 | Travison | G06F 16/2255 |
| 8,327,256 B2 | 12/2012 | Choudhury | |
| 2004/0199870 A1 * | 10/2004 | Anderson | G06F 40/177 715/234 |
| 2005/0065963 A1 * | 3/2005 | Ziemann | G06F 16/2246 707/999.102 |
| 2009/0138686 A1 * | 5/2009 | Gruetzner | G06F 16/9024 712/E9.016 |
| 2010/0036824 A1 * | 2/2010 | Gu | G06F 15/16 707/797 |
| 2010/0138449 A1 * | 6/2010 | Williamson | G06F 16/2428 707/802 |
| 2010/0272367 A1 * | 10/2010 | Criminisi | G06T 11/001 382/195 |
| 2011/0321154 A1 * | 12/2011 | Dau | G06F 21/6218 726/17 |
| 2012/0158797 A1 * | 6/2012 | Hermanns | G06F 16/242 707/810 |
| 2012/0226720 A1 * | 9/2012 | Schnelle | G06F 16/86 707/803 |
| 2017/0068714 A1 | 3/2017 | Selfridge et al. | |
| 2018/0024970 A1 * | 1/2018 | Mirra | G06F 3/04842 705/36 R |
| 2019/0377801 A1 | 12/2019 | McKee et al. | |
| 2020/0151852 A1 * | 5/2020 | Wang | G06V 40/172 |
| 2020/0219619 A1 * | 7/2020 | Feczko | G06N 20/20 |

FOREIGN PATENT DOCUMENTS

WO 9215954 A1 9/1992

\* cited by examiner

*Primary Examiner* — Miranda Le
(74) *Attorney, Agent, or Firm* — Zilka-Kotab, P.C.

(57) ABSTRACT

As described herein, a system, method, and computer program are provided for presenting tree data structures in tables. In use, a forest data structure storing data is identified. Additionally, the forest data structure is converted to a plurality of matrices. Further, the plurality of matrices are used to present the data in a table.

8 Claims, 7 Drawing Sheets

IDM

| 1 2 4 |
| 1 3 5 |
| 1 3 6 |

FIG. 2B

CSN

| 0 0 0 |
| 0 1 1 |
| 0 1 2 |

FIG. 2C

CEM

| 2 0 0 |
| 2 2 1 |
| 2 2 2 |

FIG. 2D

Spans
CEM-CSM+1

| 3 | 1 | 1 |
| 3 | 2 | 1 |
| 3 | 2 | 1 |

FIG. 2E

Renders
CSM[c,r] == r

| 1 | 1 | 1 |
| 0 | 1 | 1 |
| 0 | 0 | 1 |

FIG. 2F

SYSTEM, METHOD, AND COMPUTER PROGRAM FOR PRESENTING TREE DATA STRUCTURES IN TABLES

FIELD OF THE INVENTION

The present invention relates to presentation of tree data structures.

BACKGROUND

Tree data structures are commonly used for storing relationships between entities in a data set. In particular, two nodes can be connected in a tree to define a relationship between the entities represented by those two nodes. However, while tree structures can be useful as a data model for storing data sets, it is difficult to then provide (i.e. display) those data sets in a presentable table format.

There is thus a need for addressing these and/or other issues associated with the prior art.

SUMMARY

As described herein, a system, method, and computer program are provided for presenting tree data structures in tables. In use, a forest data structure storing data is identified. Additionally, the forest data structure is converted to a plurality of matrices. Further, the plurality of matrices are used to present the data in a table.

BRIEF DESCRIPTION OF THE DRAWINGS

FIG. 2B illustrates an exemplary identifier (ID) matrix generated for the tree data structure of FIG. 2A, in accordance with one embodiment.

FIG. 2C illustrates an exemplary cell start matrix generated for the tree data structure of FIG. 2A, in accordance with one embodiment.

FIG. 2D illustrates an exemplary cell end matrix generated for the tree data structure of FIG. 2A, in accordance with one embodiment.

FIG. 2E illustrates an exemplary span matrix generated using the cell start matrix of FIG. 2C and the cell end matrix of FIG. 2D, in accordance with one embodiment.

FIG. 2F illustrates an exemplary render matrix generating using the cell start matrix of FIG. 2C, in accordance with one embodiment.

DETAILED DESCRIPTION

Figure 1:
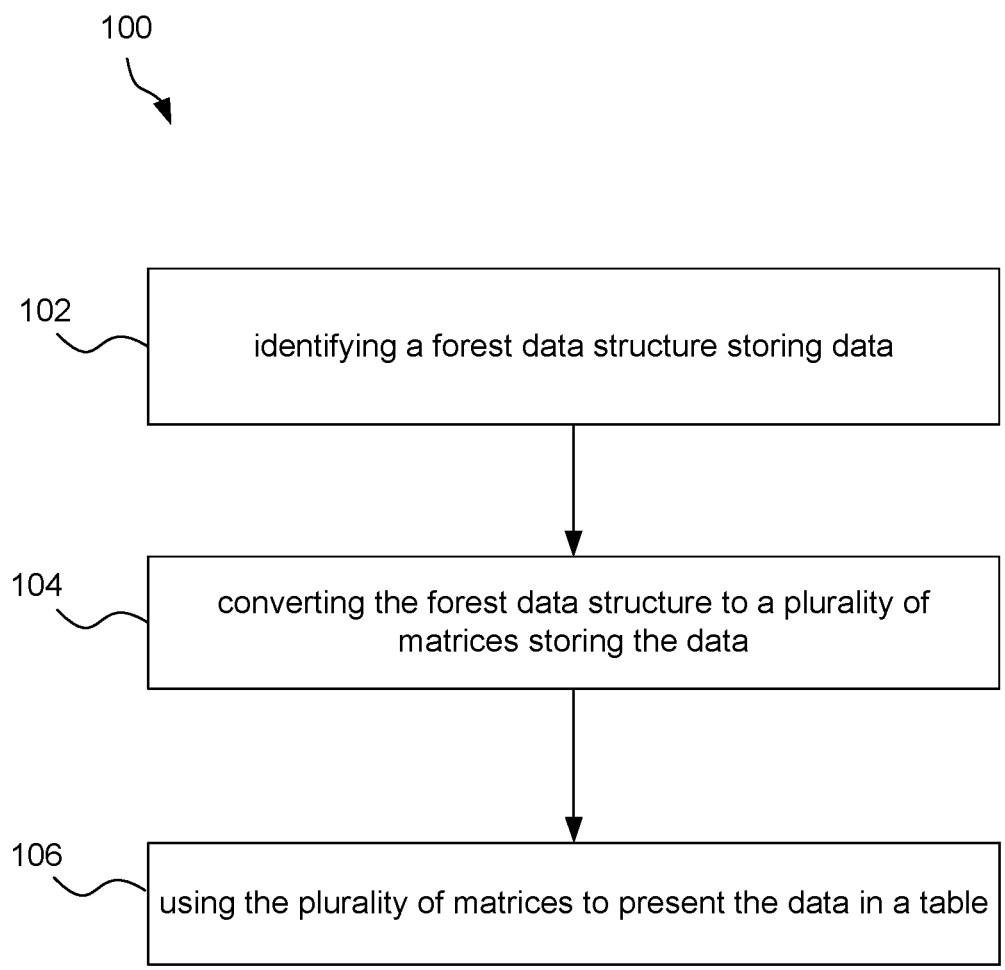
FIG. 1 illustrates a method for presenting a tree data structure in a table, in accordance with one embodiment.

FIG. 1 illustrates a method 100 for presenting a tree data structure in a table, in accordance with one embodiment. In one embodiment, the method 100 may be performed by a computer system (e.g. server), such as that described below with reference to FIGS. 5 and/or 6. For example, the method 100 may be performed by any computer processor in communication with a memory storing a tree data structure and a display for presenting a table representing the tree data structure.

In operation 102, a forest data structure storing data is identified. The forest data structure includes a plurality of tree data structures, such as an array of tree data structures.

The forest data structure may store any type of data. For example, the data may be employees identified within a human resources system, folders in a computer storage, family members, or any other type data having a hierarchical structure capable of being defined within the forest data structure.

The forest data structure may be identified by accessing a portion of the memory storing the forest data structure, in one embodiment. In another embodiment, the forest data structure may be identified responsive to a request to present the data in the forest data structure using a table. The request may be made by a user via a user interface.

Additionally, in operation 104, the forest data structure is converted to a plurality of matrices. The matrices indicate the data stored in the forest data structure. The matrices also indicate the relationships within the data as defined by the forest data structure.

In one embodiment, the matrices indicate whether each cell in the forest data structure should be rendered in the table. In another embodiment, the matrices indicate a number of rows each cell in the forest data structure should span in the table. In yet another embodiment, the matrices indicate an ID of each cell in the forest data structure. In a further embodiment, the matrices indicate a beginning row index of each cell in the forest data structure. In still yet a further embodiment, the matrices indicate an ending row index of each cell in the forest data structure. Thus, the matrices store all information necessary to allow the forest data structure to be presented in a table, as described in more detail below.

For example, the forest data structure may be converted to a plurality of matrices in two steps. In a first step, (3) matrices may be generated for the forest data structure. A first matrix of the (3) matrices is an identifier (IDM) matrix. The ID matrix stores an ID of each cell in the forest data structure. Each element in this matrix stores the ID of the cell corresponding to the element's row and column.

A second matrix of the (3) matrices is a cell start (CSM) matrix. Each element in the cell start matrix corresponds with an element in the ID matrix. Corresponding elements may be located at a same matrix position within the ID and cell start matrices. Each element in the cell start matrix stores the beginning row index of the cell corresponding to the element's row and column.

A third matrix of the (3) matrices is a cell end matrix. Each element in the cell end matrix corresponds with an element in the ID matrix. Corresponding elements may be located at a same matrix position within the ID and cell end matrices. Each element in this matrix stores the ending row index of the cell corresponding to the element's row and column.

In a second step, (2) matrices may be created from the (3) matrices created in the first step. A first matrix of the (2) matrices is a span matrix. Each element in the span matrix corresponds with an element in the ID matrix, and indicates a span (in rows) of the corresponding element in the ID matrix. Corresponding elements may be located at a same matrix position within the ID and span matrices. The span matrix is generated using the cell start matrix and the cell end matrix, including subtracting the cell start matrix from the cell end matrix to generate a result and then adding a matrix of all 1's to the result (i.e. adding a 1 to each element in the resulting matrix).

A second matrix of the (2) matrices is a render matrix. Each element in the render matrix corresponds with an element in the ID matrix, and indicates whether to render, in the table, the corresponding element of the ID matrix. Corresponding elements may be located at a same matrix position within the ID and render matrices. The render matrix is generated using the cell start matrix, including by setting a value of each element in the render matrix based on a corresponding element value in the cell start matrix. The value of the element in the render matrix may be set to 1 (or any other first defined value) when the element value in the cell start matrix is equal to a row of the element in the render matrix, otherwise the value of the element in the render matrix may be set to zero (or any other second defined value).

To this end, the matrices may then be used to configure a table presenting the data from the forest data structure. In particular, as shown in operation 106, the plurality of matrices are used to present the data in a table. The table may then be displayed, in a user interface, to the user that requested the data of the forest data structure to be presented in a table format.

In one embodiment, the table is configured based on the span matrix and the render matrix. For example, for each element in the ID matrix, the render matrix may be used to determine whether to render the cell in the forest data structure corresponding to that element in the ID matrix (e.g. render if a "1" in the render matrix). Further, a number of rows each of the cells to be rendered span across may be determined from the span matrix.

By generating the table using the matrices, as described above, the table may be able to derive various pieces of information from the given forest in order to properly render the trees in the table. The table must be able to do so for every given row and column. So given row <em>r</em> and column <em>c</em>, the table should be able to derive the following:

Whether a cell should be rendered or not
How many rows a cell should span across
What is the corresponding id of a given cell
What is the beginning row index of a given cell
What is the ending row index of a given cell By presenting the forest in the table, a large number of entities included in the forest may be presented. Optionally bulk operations may then be performed on the entities using the table. As another option, the table may be used within an editor application where the user has the ability to add, remove or update entities within the forest data structure via the table.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2A:
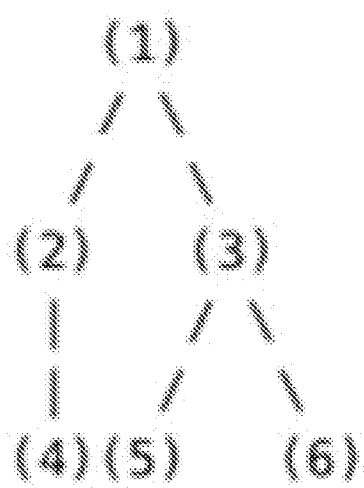
FIG. 2A illustrates an exemplary tree data structure, in accordance with one embodiment.

FIGS. 2A-G illustrate an exemplary implementation of the method 100 of FIG. 1. In particular, FIG. 2A illustrates an exemplary tree data structure, in accordance with one embodiment. The tree data structure is included in at least a portion of a forest data structure. The tree data structure includes a root node having a plurality of branches. Each cell (i.e. entity or node) in the tree data structure is represented by a unique ID for that entity. For example, the root cell is represented by ID (1).

FIG. 2B illustrates an exemplary identifier (ID) matrix generated for the tree data structure of FIG. 2A, in accordance with one embodiment. The ID matrix stores an ID of each cell in the tree data structure. Further, each element in the ID matrix corresponds to a single cell in the table, but a single cell can correspond to more than one element in the matrix (when it is spanning over more than 1 row). For example, the first row in the ID matrix represents the following path in the tree data structure: (1)-(2)-(4). The second row in the ID matrix represents the following path in the tree data structure: (1)-(3)-(5).

FIG. 2C illustrates an exemplary cell start matrix generated for the tree data structure of FIG. 2A, in accordance with one embodiment. Each element in the cell start matrix corresponds with an element in the ID matrix. Corresponding elements may be located at a same matrix position within the ID and cell start matrices. Each element in the cell start matrix stores the beginning row index of the cell corresponding to the element's row and column. For example, cells (1), (2), and (4) start at row 0; cells (3) and (5) start at row 1; and cell (6) starts at row (2).

FIG. 2D illustrates an exemplary cell end matrix generated for the tree data structure of FIG. 2A, in accordance with one embodiment. Each element in the cell end matrix corresponds with an element in the ID matrix. Corresponding elements may be located at a same matrix position within the ID and cell end matrices. Each element in the cell end matrix stores the ending row index of the cell corresponding to the element's row and column. For example, cells (2) and (4) end at row 1; cell (5) ends at row (2); and cells (1), (3), and (6) end at row 2.

FIG. 2E illustrates an exemplary span matrix generated using the cell start matrix of FIG. 2C and the cell end matrix of FIG. 2D, in accordance with one embodiment. Each element in the span matrix corresponds with an element in the ID matrix, and indicates a span (in rows) of the cell corresponding to the element's row and column. Corresponding elements may be located at a same matrix position within the ID and span matrices.

The span matrix is generated by subtracting the cell start matrix from the cell end matrix to generate a result and then adding a matrix of all 1's to the result (i.e. adding a 1 to each element in the resulting matrix). In the example shown, the span matrix indicates that cell (1) spans 3 rows; cell (3) spans 2 rows; and cells (2), (4), (5), and (6) span 1.

FIG. 2F illustrates an exemplary render matrix generated using the cell start matrix of FIG. 2C, in accordance with one embodiment. Each element in the render matrix corresponds with an element in the ID matrix, and indicates whether to render, in the table, the corresponding element of the ID matrix. Corresponding elements may be located at a same matrix position within the ID and render matrices. The render matrix is generated by comparing the value of each element in the cell start matrix with its row index.

The value of the element in the render matrix is set to 1 when the corresponding element value in the cell start matrix is equal to the row index of that element, otherwise the value of the element in the render matrix is set to zero.

Figure 2G:
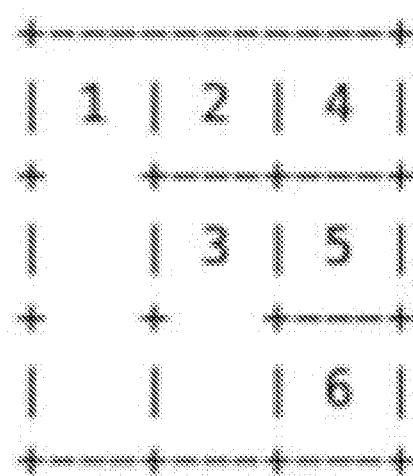
FIG. 2G illustrates an exemplary table presented based on the ID matrix of FIG. 2B, the span matrix of FIG. 2E, and the render matrix of FIG. 2F, in accordance with one embodiment.

In the example shown, the render matrix indicates that cell (1) is rendered at position (0,0) in the table; cell (2) is rendered at position (0,1) in the table; cell (4) is rendered at position (0,2) in the table; nothing is rendered at position (1,0) in the table; cell (3) is rendered at position (1,1) in the table; cell (5) is rendered at position (1, 2) in the table;

nothing is rendered at positions (2,0) and (2,1) in the table; and cell (6) is rendered at position (2,2) in the table. FIG. 2G illustrates an exemplary table presented based on the ID matrix of FIG. 2B, the span matrix of FIG. 2E, and the render matrix of FIG. 2F, as described.

Figure 3:
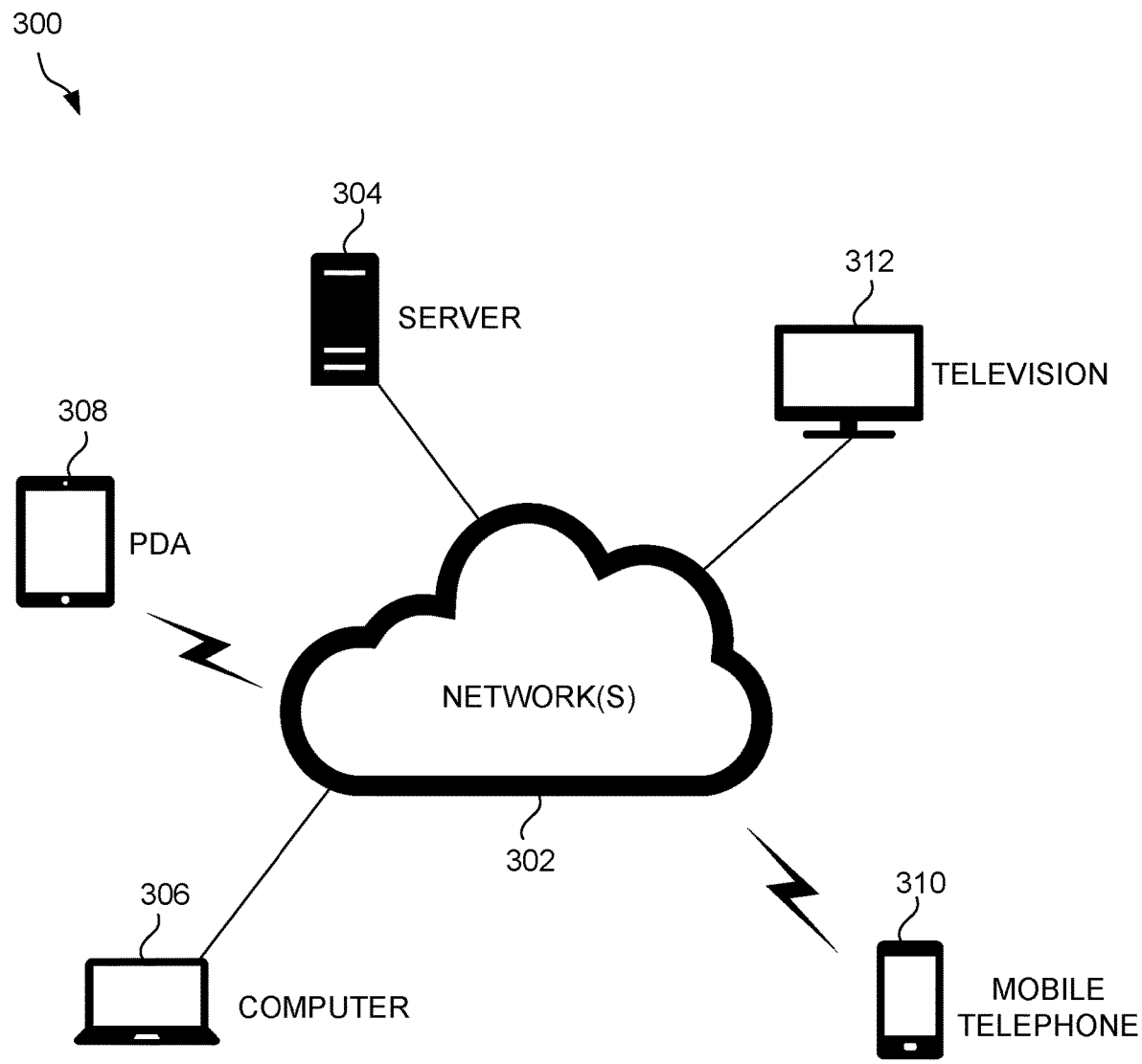
FIG. 3 illustrates a network architecture, in accordance with one possible embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, etc.

Figure 4:
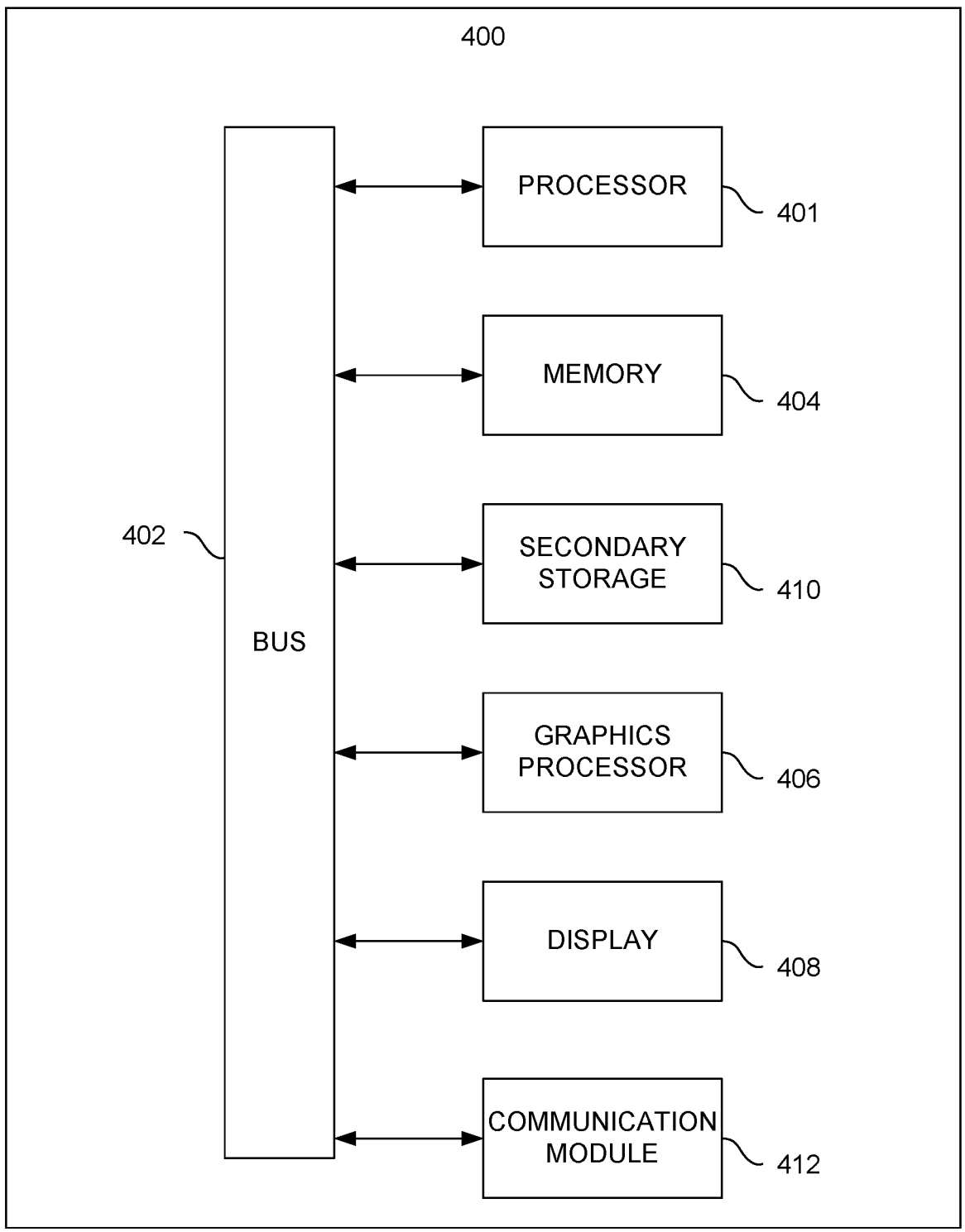
FIG. 4 illustrates an exemplary system, in accordance with one embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of non-transitory computer-readable media.

The system 400 may also include one or more communication modules 412. The communication module 412 may be operable to facilitate communication between the system 400 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
    identifying a forest data structure storing data;
    converting the forest data structure to a plurality of matrices, wherein the plurality of matrices indicate an ending row index of each cell in the forest data structure, and wherein the forest data structure is converted to the plurality of matrices by:
    generating an identifier (ID) matrix for the forest data structure that stores an ID of each cell in the forest data structure, where each element in the ID matrix stores an ID of the cell corresponding to the element's row and column,
    generating a cell start matrix for the forest data structure, where each element in the cell start matrix stores a beginning row index of the cell corresponding to the element's row and column, and
    generating a cell end matrix for the forest data structure, where each element in the cell end matrix stores the ending row index of the cell corresponding to the element's row and column,
    generating a span matrix by subtracting the cell start matrix from the cell end matrix to generate a result and then adding a matrix of all 1's to the result, and
    generating a render matrix using the cell start matrix, where the render matrix indicates whether to render, in a single table, a corresponding element of the ID matrix, and where for each element in the render matrix:
        a value of the element in the render matrix is set to 1 when a corresponding element value in the cell start matrix is equal to a row of the element in the render matrix, otherwise
        the value of the element in the render matrix is set to zero; and
    using the span matrix and the render matrix to configure the single table that presents the data stored in the forest data structure;
    wherein the single table is at least one of:
        displayed to a user for enabling the user to view the data stored in the forest data structure,
        used for performing bulk operations on the data stored in the forest data structure, or
        used for enabling a user to modify the data stored in the forest data structure.

2. The non-transitory computer readable medium of claim 1, wherein the forest data structure is an array of tree data structures.

3. The non-transitory computer readable medium of claim 1, wherein the plurality of matrices indicate whether each cell in the forest data structure should be rendered in the single table.

4. The non-transitory computer readable medium of claim 1, wherein the plurality of matrices indicate a number of rows each cell in the forest data structure should span in the single table.

5. The non-transitory computer readable medium of claim 1, wherein the plurality of matrices indicate the ID of each cell in the forest data structure.

6. The non-transitory computer readable medium of claim 1, wherein the plurality of matrices indicate the beginning row index of each cell in the forest data structure.

7. A method, comprising:
    identifying a forest data structure storing data;
    converting the forest data structure to a plurality of matrices, wherein the plurality of matrices indicate an ending row index of each cell in the forest data structure, and wherein the forest data structure is converted to the plurality of matrices by:
    generating an identifier (ID) matrix for the forest data structure that stores an ID of each cell in the forest data structure, where each element in the ID matrix stores an ID of the cell corresponding to the element's row and column,
    generating a cell start matrix for the forest data structure, where each element in the cell start matrix stores a beginning row index of the cell corresponding to the element's row and column, and
    generating a cell end matrix for the forest data structure, where each element in the cell end matrix stores the ending row index of the cell corresponding to the element's row and column, generating a span matrix by subtracting the cell start matrix from the cell end matrix to generate a result and then adding a matrix of all 1's to the result, and generating a render matrix using the cell start matrix, where the render matrix indicates whether to render, in a single table, a corresponding element of the ID matrix, and where for each element in the render matrix:
- a value of the element in the render matrix is set to 1 when a corresponding element value in the cell start matrix is equal to a row of the element in the render matrix, otherwise
- the value of the element in the render matrix is set to zero; and
- using the span matrix and the render matrix to configure the single table that presents the data stored in the forest data structure;

wherein the single table is at least one of:
- displayed to a user for enabling the user to view the data stored in the forest data structure,
- used for performing bulk operations on the data stored in the forest data structure, or
- used for enabling a user to modify the data stored in the forest data structure.

8. A system, comprising:

a non-transitory memory storing instructions; and one or more processors in communication with the non-transitory memory that execute the instructions to perform a method comprising:

identifying a forest data structure storing data;

converting the forest data structure to a plurality of matrices, wherein the plurality of matrices indicate an ending row index of each cell in the forest data structure, and wherein the forest data structure is converted to the plurality of matrices by:

generating an identifier (ID) matrix for the forest data structure that stores an ID of each cell in the forest data structure, where each element in the ID matrix stores an ID of the cell corresponding to the element's row and column, generating a cell start matrix for the forest data structure, where each element in the cell start matrix stores a beginning row index of the cell corresponding to the element's row and column, and generating a cell end matrix for the forest data structure, where each element in the cell end matrix stores the ending row index of the cell corresponding to the element's row and column, generating a span matrix by subtracting the cell start matrix from the cell end matrix to generate a result and then adding a matrix of all 1's to the result, and generating a render matrix using the cell start matrix, where the render matrix indicates whether to render, in a single table, a corresponding element of the ID matrix, and where for each element in the render matrix:
- a value of the element in the render matrix is set to 1 when a corresponding element value in the cell start matrix is equal to a row of the element in the render matrix, otherwise
- the value of the element in the render matrix is set to zero; and
- using the span matrix and the render matrix to configure the single table that presents the data stored in the forest data structure;

wherein the single table is at least one of:
- displayed to a user for enabling the user to view the data stored in the forest data structure,
- used for performing bulk operations on the data stored in the forest data structure, or
- used for enabling a user to modify the data stored in the forest data structure.

* * * * *